3,459,726
PROCESS FOR POLYMERIZING CONJUGATED DI-
OLEFINS WITH A CATALYST CONSISTING OF A
COBALT- OR NICKEL-CONTAINING MATERIAL
AND AN ORGANOALUMINUM COMPOUND IN
THE PRESENCE OF A DIESTER OF THIODI-
PROPIONIC ACID
Shotaro Sugiura, Fumio Tasaka, Haruo Ueno, Minoru
Kono, Nobuyuki Katagiri and Nobumasa Sakinaga,
Yamaguchi-ken, Japan, assignors to Ube Industries,
Ltd., Yamaguchi-ken, Japan
No Drawing. Filed Dec. 22, 1966, Ser. No. 603,740
Int. Cl. C08d 1/18
U.S. Cl. 260—94.3                                    6 Claims

ABSTRACT OF THE DISCLOSURE

Conjugated diolefin polymers substantially free from gel and having high cis-1,4-addition contents are produced by polymerizing conjugated diolefins with the use of a catalyst prepared from a material selected from the group consisting of metallic cobalt or nickel, cobalt or nickel compounds, cobalt or nickel complex compounds and a material formed by electrochemically depositing metallic cobalt or nickel on metallic zinc, and an organoaluminum compound in the presence of a diester of thio-dipropionic acid of the formula:

$$\begin{array}{l} CH_2-CH_2-COOR_1 \\ | \\ S \\ | \\ CH_2-CH_2-COOR_2 \end{array}$$

where $R_1$ and $R_2$ are each alkyl groups of 8–20 carbon atoms.

---

This invention relates to a process for the polymerization of conjugated diolefins. More particularly, the present invention relates to a process for producing conjugated diolefin polymers substantially free from gel and having a high cis-1,4-addition contents which comprises effecting polymerization of conjugated diolefins in the presence of a catalyst prepared from a member selected from the group consisting of metallic cobalt, cobalt compounds, cobalt complex compounds, a material formed by electrochemically depositing metallic cobalt on metallic zinc, metallic nickel, nickel compounds, nickel complex compounds, and a material formed by electrochemically depositing metallic nickel on metallic zinc, as one component, and an organoaluminum compound, as the other component, and also in the presence of diester of thio-dipropionic acid.

The use of catalysts prepared from transition metallic compounds and organometallic compounds in the manufacture of cis-1,4-addition polymers of conjugated diolefins have been known in the art. Especially in the production of cis-1,4-polybutadiene from 1,3-butadiene, it is known that catalysts obtained from nickel or cobalt compounds and organoaluminum compounds prove beneficial. However, such catalyst systems composed of transition metallic compounds and organometallic compounds have so low polymerization activity that they must be used in large quantities in the manufacture of cis-1,4-addition polymers from conjugated diolefins. A consequent disadvantage is that the resulting polymers contain large amounts of residual catalysts. A further disadvantage is that such catalyst systems promote gelation of conjugated diolefins under the polymerization conditions and therefore the polymerization of conjugated diolefins in the presence of such catalysts can hardly yield polymers having low gel contents.

Numerous proposals have hitherto been made to overcome the foregoing difficulties. By way of example, addition of amines, pyridine, nitriles, amides, ethers, boron halides, and the like to the polymerization systems of conjugated diolefins have been proposed. Those methods have invariably failed to prove fully satisfactory as improvements for eliminating the disadvantages of the catalyst systems above stated, because they still require large amounts of catalysts and give polymers having fairly large gel contents and sometimes yield brown-colored polymers.

The present invention pertains to a novel process for the polymerization of conjugated diolefins for eliminating the above-mentioned disadvantages of the catalyst systems in a most satisfactory manner.

It is an object of the present invention to provide a process for producing conjugated diolefin polymers having high cis-1,4-addition contents at high yields with a little amount of catalysts.

Another object of the present invention is to provide a process for producing conjugated diolefin polymers which are substantially free from gels.

A further object of the invention is to provide a process for producing conjugated diolefin polymers which are substantially not colored and are transparent.

The foregoing objects of the present invention are achieved by allowing a diester of thio-dipropionic acid to be present in the polymerization system in the production of a polymer through polymerization of a conjugated diolefin in the presence of a catalyst prepared from the metal of cobalt or nickel, a compound or complex compound thereof, or a material formed by electrochemically deposing metallic cobalt or metallic nickel on metallic zinc, and an organoaluminum compound.

Suitable diesters of thio-dipropionic acid for use in the practice of the invention are those of the general formula:

$$\begin{array}{l} CH_2-CH_2-COOR_1 \\ | \\ S \\ | \\ CH_2-CH_2-COOR_2 \end{array}$$

wherein $R_1$ and $R_2$ are alkyl radicals each having 8 to 20 carbon atoms, which may or may not be same.

Diesters of thio-dipropionic acid may be used either singly or in combination of two or more diesters. Most preferable diesters are dilauryl-3,3'-thio-dipropionate and distearyl-3,3'-thio-dipropionate.

The amount of diester of thio-dipropionic acid to be used is preferably within the range of 0.01 to 10 mM. (millimols) per 100 g. of conjugated diolefin monomer. Although an optimum diester amount depends on the type of catalyst and the polymerization conditions to be employed (e.g. the monomer concentration, catalyst concentration, and polymerization temperature), usually an amount in the range of 0.1 to 1.0 mM. per 100 g. of conjugated diolefin monomer is most preferable.

By the presence of a diester of thio-dipropionic acid in the polymerization system of conjugated diolefin the polymerization activity of the polymerization catalyst is remarkably enhanced. Thus, the addition of the diester to the polymerization system makes it possible to decrease the amount of catalyst to be used, particularly the amount of expensive organoaluminum compound to one-fifth to one-fiftieth of the corresponding amount required when such addition is not effected, or even a smaller amount. Accordingly, the amount of residual catalyst to be contained in the resulting polymer is sharply decreased and, even though the residual catalyst is not removed by extraction from the polymer, the ash content of the polymer can be reduced to about 0.1 to 0.2%.

By way of illustration, when a diester of thio-dipropionic acid is not added to the polymerization system, the polymerization yield cannot exceed 80% after a polymerization period of one hour unless more than about 15 mM. of organoaluminum compound is used per 100 g. of conjugated diolefin monomer. In a striking contrast to this, when the diester is added to the polymerization system in an amount ranging from 0.01 to 10 mM. per 100 g. of the conjugated diolefin, a polymerization yield of over 80% is obtained after a polymerization period of one hour with only 0.5 to 10 mM. of the organoaluminum compound per 100 g. of the conjugated diolefin monomer. The amount of cobalt or nickel compound or complex compound to be used in the invention is preferably in the range of 0.01 to 1.0 mM. per 100 g. of the conjugated diolefin monomer, and the amount of metallic cobalt or metallic nickel is preferably in the range of 0.02 to 1.0 g. per 100 g. of the conjugated diolefin monomer. The material formed by electrochemically depositing metallic cobalt or metallic nickel on metallic zinc is suitably used in an amount of 0.03 to 1.0 g. per 100 g. of the conjugated diolefin monomer.

Since diesters of thio-dipropionic acid have excellent inhibitive actions against gelation, they can substantially eliminate the possibility of gelation when allowed to be present in the polymerization systems of conjugated diolefins.

The presence of those diesters in the polymerization systems of conjugated diolefins will not stain the resulting polymers, which are transparent and only slightly tinged but otherwise similar to the polymers obtained without the presence of the diesters. (The addition of amines according to the usual practice will give brownish tinged polymers.)

The only slightly tinged transparent polymers can be colored as desired and hence have extensive applications.

There is no restriction as to the procedure for adding diesters of thio-dipropionic acid, and any known method may be used insofar as it permits the presence of one such diester in the reaction system during the polymerization of conjugated diolefin. For example, the diester may be allowed to be present beforehand in the polymerization solvent for the polymerization, or may be added to the polymerization system simultaneously with or after the addition of the catalyst, or in mixture with the conjugated diolefin monomer. When the catalyst is to be aged prior to the use in the polymerization reaction, it is desirable that the diester is added after the catalyst has been aged.

The metallic cobalt or metallic nickel which constitutes one component of the catalyst to be used in the invention is not limited to simple substance but may be Raney cobalt or Raney nickel or an alloy containing cobalt or nickel. Suitable compounds of cobalt or nickel are halides, particularly chloride, nitrosyl halide, octoate, and naphthenate of cobalt or nickel. Suitable as the complex compound of cobalt or nickel is cobalt- or nickel acetylacetonate.

The material formed by electrochemically depositing metallic cobalt or metallic nickel on metallic zinc, which has recently been developed by some of the present inventors, is prepared in the following way.

Metallic zinc powder is thrown in an aqueous solution of a water-soluble salt of cobalt or nickel (e.g. halide or mineral acid salt) at a temperature of not higher than 50° C., and the solution is stirred continuously until metallic cobalt or metallic nickel is electrochemically deposited on metallic zinc due to the difference of normal electrode potential between zinc and cobalt or nickel. The resulting precipitate is separated by filtration, washed with water, and dried.

Suitable organoaluminum compounds to constitute the other component of the catalyst according to the present invention are compounds of the general formula $$AlR_nX_{3-n}$$

(wherein R is alkyl, cycloalkyl, or phenyl radical, X is a halogen atom, and $n$ is a number between 1 and 3 with or without decimals) used either singly or in mixture.

Particularly desirable organic aluminum compounds include monoethyl aluminum dichloride, diethyl aluminum monochloride, triethyl aluminum, diisobutyl aluminum monochloride, diphenyl aluminum monochloride, and dicyclohexyl aluminum monochloride.

Even when Lewis acid or Lewis base is used in combination with the catalyst components above enumerated, the aforesaid effect of the invention is achieved as well by the addition of the diester to the polymerization system.

Although the catalyst of the invention may be used in the polymerization of conjugated diolefin in an inert solvent immediately after the compounding of the two components, the polymerization activity of the catalysts can be greatly enhanced by aging the catalysts under suitable conditions before they are brought into contact with the conjugated diolefin. Suitable aging procedure is to place both of the catalyst components into an inert solvent and to keep them together at a temperature within the range of 10 to 100° C., or slightly above the polymerization temperature, for 30 to 120 minutes. The catalysts thus aged have a polymerization activity five to seven times that of non-aged catalysts.

Conjugated diolefins useful in the invention include 1,3-butadiene, isoprene, and 2-methyl-1,3-pentadiene. These conjugated diolefins may be either polymerized singly or copolymerized in mixture. Further, the conjugated diolefins may be copolymerized with other unsaturated hydrocarbons.

The inert solvent for use in the polymerization of conjugated diolefins and the inert solvent for aging of catalysts may be dissimilar, but are preferably the same for convenience. Suitable inert solvents for such purposes are aromatic, saturated aliphatic, and alicyclic hydrocarbons and derivatives thereof (particularly halogen substitution products). Preferably inert solvents for practical use are, for example, benzene, toluene, and monochlorobenzene.

Suitable concentration of conjugated diolefin monomer in an inert solvent prior to the polymerization is in the range of 5 to 30 wt. percent.

The suitable polymerization temperature is between $-20°$ and $+80°$ C., more preferably between $+5°$ and $+50°$ C. The polymerization may be effected at or above the atmospheric pressure.

In order to terminate the polymerization reaction of the invention, it is only necessary to add to the polymerization system a small amount of substance which inactivates the catalyst, e.g., water, alcohol, acetone, acetic acid, or ether. At that time, addition of an antioxidant of any known type to the conjugated diolefin polymer is recommended. When the product solution in which the polmerization of conjugated diolefin has been terminated by the addition of a small amount of the substance which inactivates the catalyst is poured into a large amount of alcohol, e.g. methanol, the polymer of conjugated diolefin coagulates. On separation and vacuum drying the resulting solid matter will form a rubber-like conjugated diolefin polymer.

In the examples of the present invention given hereunder, the microstructure of conjugated diolefin polymers were determined by the method of R. R. Hampton from infrared absorption spectra (Analytical Chemistry, 21, 923 (1949)). The intrinsic viscosity values of the conjugated diolefin polymers were calculated on the basis of viscosity in toluene at 26° C. as determined with Ostwald viscometer. The gel content in a conjugated diolefin polymer was determined as follows. 0.15 g. of dry polymer was placed in a container formed of stainless steel gauze having 100 holes per square centimeter and a capacity of 1.5 ml., and then was dipped in 100 ml. of benzene. After allowed to stand in a dark place at about 25° C. for 48 hours, the container was taken out, the residual gel in the container was dried in vacuum and weighed. The percent by weight of the insoluble polymer (i.e. gel) on the basis of the total amount of the polymer was expressed as the gel content of the particular polymer.

EXAMPLE 1

A reaction vessel having a capacity of 150 l. and equipped with a stirrer and a jacket for coolant circulation was dried, and the air inside was completely replaced by nitrogen gas. 98 liter of a mixed solution of benzene and 1,3-butadiene which contained 102 g. of 1,3-butadiene per liter of the mixed solution was introduced into the vessel. Next, one liter of a solution in benzene of diethyl aluminum monochloride (containing 0.3 mole of $Al(C_2H_5)_2Cl$ per liter of the solution) was added, and further one liter of a solution in benzene of cobalt octoate and dilauryl-3,3'-thio-dipropionate (containing 0.004 mole of cobalt octoate and 0.025 mole of dilauryl-3,3'-thio-dipropionate per liter of the solution) was added. Polymerization was effected at 10° C. for one hour with constant stirring. The reaction was terminated by adding a small amount of methanol, two liters of a 5% benzene solution of phenyl-β-naphthylamine (anti-oxidant) was added, and the reaction mixture was placed into 250 liter of methanol. Coagulated polymer was separated, washed with water, and dried at 90° C. Cis-1,4-polybutadiene was thus obtained at a yield of 85%. It had following properties.

Intrinsic viscosity $[\eta]\ _{toluene}^{26°\ C.}$ ------------------------ 3.0
Cis-1,4-addition content ---------------Percent-- 98.2
Gel content ----------------------------do---- 0

EXAMPLES 2-6

1,3-butadiene was polymerized under the same conditions as employed in Example 1 except that the amounts of dilauryl-3,3'-thio-dipropionate, cobalt octoate, and diethyl aluminum monochloride and the monomer concentration were varied. The results obtained are shown in Table 1, in which the amounts of cobalt octate (CoOct.), diethyl aluminum monochloride (AlEt₂Cl) and dilauryl-3,3'-thio-dipropionate (DLS) are indicated in terms of values per 100 g. of 1,3-butadiene.

In Table 1 there are also given the results obtained without using dilauryl-3,3'-thio-dipropionate, as Reference Example 1. Comparison of Reference Example 1 with Examples 2 to 6 indicates that, in order to attain the same yield as in the examples of the invention, Reference Example 1 requires a fairly large amount of diethyl aluminum monochloride and is also characterized by the production of gel.

EXAMPLES 7-8

1,3-butadiene was polymerized under the same conditions as in Example 1 except that as the cobalt compound cobalt naphthenate (CoNaph.) was used in lieu of cobalt octoate. The results are shown in Table 2, in which the amounts of the catalyst and dilauryl-3,3'-thio-dipropionate used are given in terms of values per 100 g. of 1,3-butadiene.

TABLE 2

| | CoNaph, mM. | AlEt₂Cl, mM. | DLS, mM. | Monomer conc., percent | Yld., percent | Cis-1,4 content, percent | $[\eta]\ _{toluene}^{26°\ C.}$ | Gel content, percent |
|---|---|---|---|---|---|---|---|---|
| Example: | | | | | | | | |
| 7 | 0.04 | 2.8 | 0.25 | 12 | 85 | 98.0 | 2.6 | 0 |
| 8 | 0.04 | 2.3 | 0.25 | 15 | 85 | 98.1 | 2.8 | 0 |

EXAMPLES 9-12

1,3-butadiene was polymerized under the same conditions as in Example 1 except that dilauryl-3,3'-thio-dipropionate was replaced by distearyl-3,3'-thio-dipropionate (hereinafter referred to as DSS) and the amounts of diethyl aluminum monochloride and DSS were varied. The results are shown in Table 3, in which the amounts of the catalyst and DSS are given in terms of values per 100 g. of 1,3-butadiene.

TABLE 3

| | CoOct, mM. | AlEt₂Cl, mM. | DSS, mM. | Monomer conc., percent | Yld., percent | Cis-1,4 content, percent | $[\eta]\ _{toluene}^{26°\ C.}$ | Gel content, percent |
|---|---|---|---|---|---|---|---|---|
| Example: | | | | | | | | |
| 9 | 0.04 | 10.0 | 0.10 | 12 | 85 | 98.0 | 3.0 | 0 |
| 10 | 0.04 | 5.0 | 0.15 | 12 | 85 | 98.1 | 3.0 | 0 |
| 11 | 0.14 | 3.0 | 0.20 | 12 | 85 | 98.0 | 3.1 | 0 |
| 12 | 0.04 | 2.5 | 0.25 | 12 | 85 | 98.2 | 3.0 | 0 |

EXAMPLE 13

1,3-butadiene was polymerized under the same conditions as in Example 1 except that the catalyst used in Example 1 (i.e. cobalt octoate and diethyl aluminum monochloride) was replaced by a catalyst composed of 7.0 g. of metallic cobalt, 1.0 mole of monoethyl aluminum dichloride, and 0.5 mole of pyridine. As the result, cis-1,4-polybutadiene having cis-1,4-addition content of 98.2%

$$[\eta]\ _{toluene}^{26°\ C.}=3.0$$

and a gel content of 0%, was obtained at a yield of 85%.

When 1,3-butadiene was polymerized in the same manner but without dilauryl-3,3'-thio-dipropionate, cis-1,4-polybutadiene having a cis-1,4-addition content of 97.6%

$$[\eta]\ _{toluene}^{26°\ C.}=3.0$$

and a gel content of 10%, was obtained at a yield of 60%.

EXAMPLE 14

1,3-butadiene was polymerized under the same conditions as in Example 1 except that the catalyst employed in Example 1 was replaced by 60 g. of a material (having a metallic cobalt content of 15%) formed by electrochemically depositing metallic cobalt on metallic zinc, and 0.5 mole of diethyl aluminum monochloride. As a result, cis-1,4-polybutadiene having a cis-1,4-addition content of 98.2%

$$[\eta]\ _{toluene}^{26°\ C.}=3.0$$

and a gel content of 0%, was obtained at a yield of 85%.

TABLE 1

| | CoOct, mM. | AlEt₂Cl, mM. | DLS, mM. | Monomer conc., percent | Yld., percent | Cis-1,4 content, percent | $[\eta]\ _{toluene}^{26°\ C.}$ | Gel content, percent |
|---|---|---|---|---|---|---|---|---|
| Example: | | | | | | | | |
| 2 | 0.04 | 2.5 | 0.25 | 15 | 85 | 98.2 | 3.2 | 0 |
| 3 | 0.04 | 1.5 | 0.25 | 20 | 85 | 98.2 | 3.5 | 0 |
| 4 | 0.04 | 10.0 | 0.10 | 12 | 85 | 98.1 | 3.1 | 0 |
| 5 | 0.04 | 5.0 | 0.15 | 12 | 85 | 98.1 | 3.1 | 0 |
| 6 | 0.04 | 3.0 | 0.20 | 12 | 85 | 98.2 | 3.1 | 0 |
| Reference example 1 | 0.04 | 20.0 | 0 | 12 | 85 | 97.8 | 3.1 | 5 |

EXAMPLE 15

1,3-butadiene was polymerized under the same conditions as in Example 14 except that the material employed in Example 14 which was formed by electrochemically depositing metallic cobalt on metallic zinc was replaced by 60 g. of a material (having a metallic nickel content of 15%) formed by electrochemically depositing metallic nickel on metallic zinc. As the result, cis-1,4-polybutadiene having a cis-1,4-addition content of 98.2%

$$[\eta]_{\text{toluene}}^{26°\text{C.}} = 3.0$$

and a gel content of 0%, was obtained at a yield of 85%.

EXAMPLE 16

Isoprene was polymerized under the same conditions as in Example 1 except that 120 g. of a material (having a metallic cobalt content of 15%) formed by electrochemically depositing metallic cobalt on metallic zinc, and 1.0 mole of diethyl aluminum monochloride were employed as a catalyst, and that polymerization time was changed to two hours. As the result, polyisoprene having a 1,4-addition content of 98.0%

$$[\eta]_{\text{toluene}}^{26°\text{C.}} = 3.6$$

and a gel content of 0%, was obtained at a yield of 60%.

What we claim is:

1. A process for producing a conjugated diolefin polymer substantially free from gel and having high cis-1,4-addition content, which comprises effecting polymerization of at least one conjugated diolefin in the presence of a catalyst prepared from (A) a material selected from the group consisting of metallic cobalt, cobalt compounds, cobalt complex compounds, a material formed by electrochemically depositing metallic cobalt on metallic zinc, metallic nickel, nickel compounds, nickel complex compounds, and a material formed by electrochemically depositing metallic nickel on metallic zinc, and (B) an organoaluminum compound of the general formula:

$$AlR_nX_{3-n}$$

wherein R is a radical selected from the class consisting of alkyl radicals, cycloalkyl radicals and phenyl radicals, X is a halogen atom, and n is a number between 1 and 3 inclusive of decimals, and also in the presence of a diester of thio-dipropionic acid of the general formula:

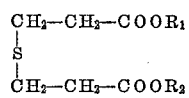

wherein $R_1$ and $R_2$ are alkyl groups each having 8 to 20 carbon atoms.

2. The process according to claim 1 wherein the diester of thio-dipropionic acid is allowed to be present in an amount of 0.01 to 10 millimols per 100 g. of the conjugated diolefin.

3. The process according to claim 1 wherein the diester of thio-dipropionic acid is a compound selected from the group consisting of dilauryl-3,3'-thio-dipropionate and distearyl-2,3'-thio-dipropionate.

4. The process according to claim 1 wherein the conjugated diolefin is a material selected from the group consisting of 1,3-butadiene, isoprene, 2-methyl-1,3-pentadiene and mixtures thereof.

5. The process according to claim 1 wherein the conjugated diolefin is polymerized in an inert solvent selected from the group consisting of aromatic, saturated aliphatic, and alicyclic hydrocarbons and derivatives thereof, at a temperature within the range of −20° C. to +80° C.

6. The process according to claim 1, wherein said catalyst is said organoaluminum compound and a material formed by electrochemically depositing a metal selected from the group consisting of metallic cobalt and metallic nickel on metallic zinc.

References Cited

UNITED STATES PATENTS

| | | | |
|---|---|---|---|
| 2,977,349 | 3/1961 | Brockway et al. | 260—94.3 |
| 3,293,230 | 12/1966 | Coover et al. | 260—93.7 |
| 3,234,198 | 2/1966 | Boor et al. | 260—94.3 |
| 3,230,208 | 1/1966 | Coover et al. | 260—93.7 |
| 3,094,514 | 6/1963 | Tucker | 260—94.3 |
| 3,068,180 | 12/1962 | Amerongen | 252—429 |
| 3,049,526 | 8/1962 | D'Alelio | 260—93.7 |

JOSEPH L. SCHOFER, Primary Examiner

R. A. GAITHER, Assistant Examiner

U.S. Cl. X.R.

252—429